Patented Apr. 14, 1925.

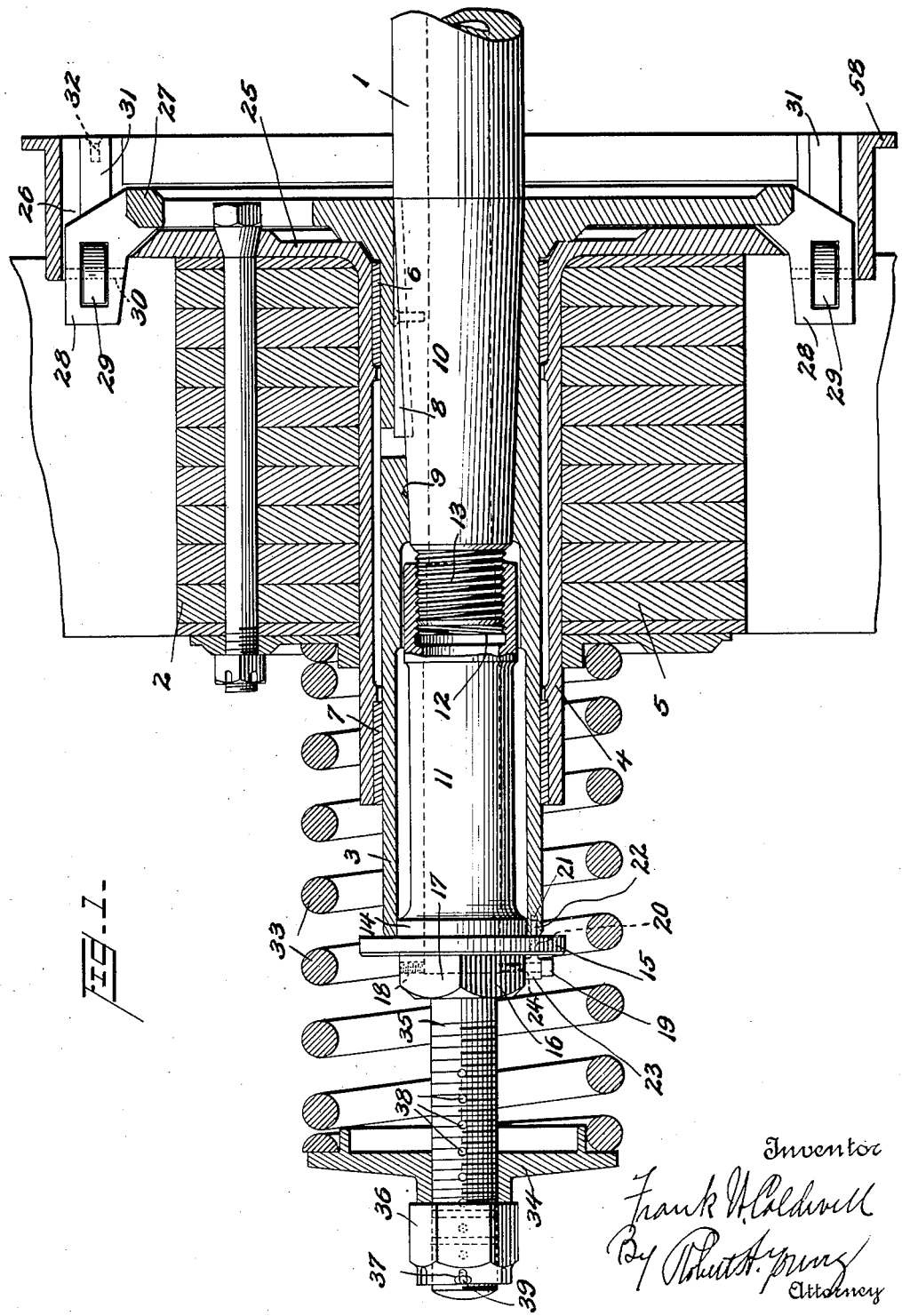

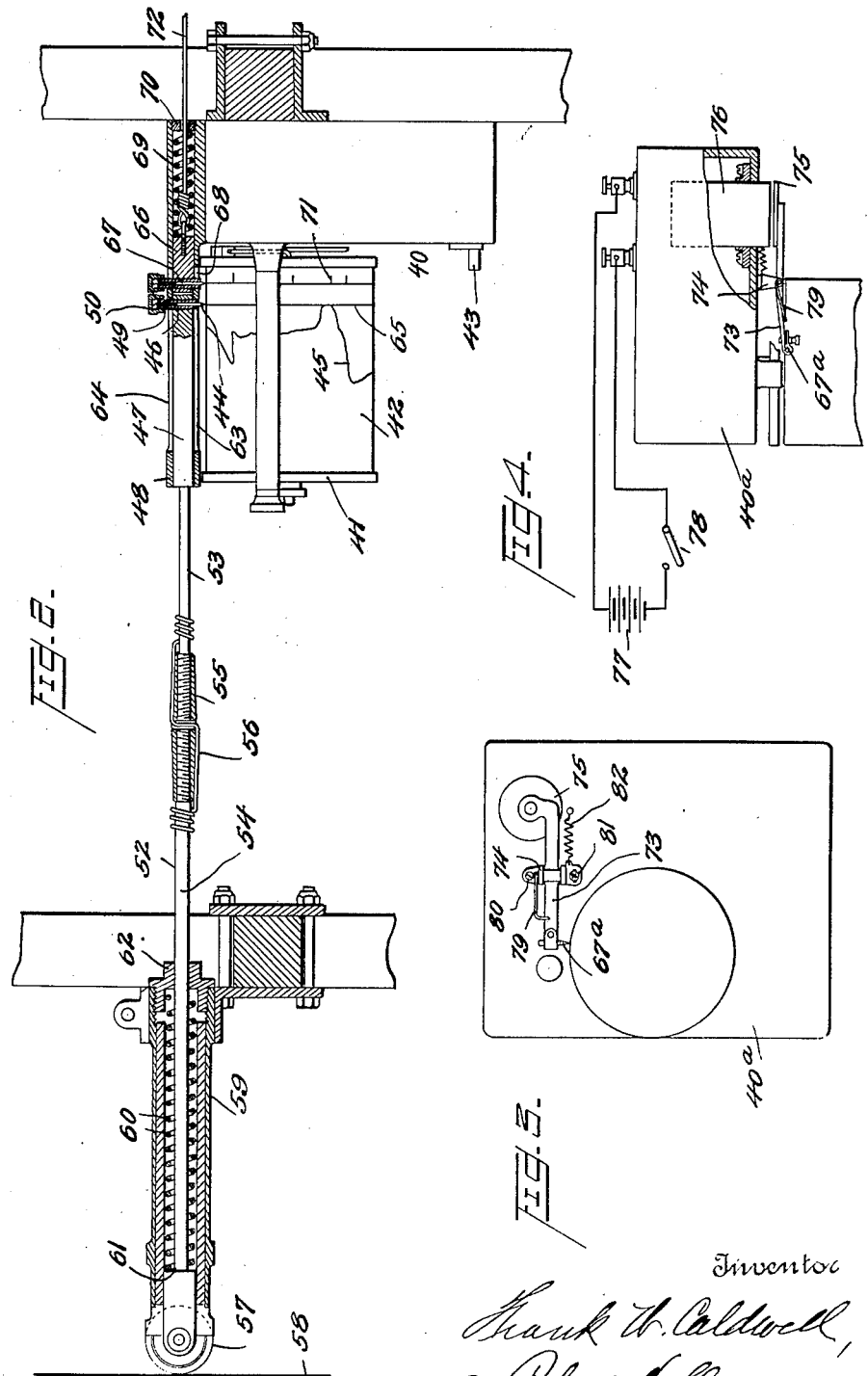

1,533,306

UNITED STATES PATENT OFFICE.

FRANK W. CALDWELL, OF DAYTON, OHIO.

THRUST METER.

Application filed January 20, 1922. Serial No. 530,723.

*To all whom it may concern:*

Be it known that I, FRANK W. CALDWELL, a citizen of the United States, residing at Dayton, in the county of Montgomery and State of Ohio, have invented certain new and useful Improvements in Thrust Meters, of which the following is a specification.

My invention relates to instruments for measuring mechanical forces, and in particular to a device for measuring the end thrust of a rotating machine element.

While the invention is broadly applicable to various mechanical arts, one particular use which I have in mind is the measuring of thrust of an aircraft propeller. The thrust meter which I have devised is admirably adapted for such use, wherein the thrust is considerable and varies over a wide range, and there is in the aeronautical art a need for such a device. An analogous use would be in connection with underwater propellers.

Since the function of an aircraft propeller is really to bore a path, as it were, through the air, this invention is peculiarly fitted for use in measuring the boring power required for media very much denser than air or water, such as earthy materials, metals, or the like.

Considering, for the purpose of illustration, its application to the aeronautical art only, it may be stated that the primary object in this instance is to provide a thrust meter which will be sensitive to the propeller thrust throughout its considerable range and in the use of which axial play of the engine shaft is not necessitated.

Another object is to provide an instrument of this nature which includes means for indicating and recording variations in propeller thrust during flight in order that the degree of thrust may be read at any time and also in order to give a continuous log of the thrust.

A further object is to provide a thrust meter which includes in its construction means for mounting the propeller slidably on the engine shaft, while preventing relative rotation of the propeller and shaft, and also includes resilient means tending to resist end thrust of the propeller on the shaft.

Owing to these details of construction, the thrust of the propeller is amplified in degree of movement, but the engine shaft need not be allowed longitudinal play and the force exerted on the shaft in that direction will be minimized by absorption.

It is an object also to provide, in addition to the resilient means just mentioned, a positive stop which will limit the degree of longitudinal movement of the propeller on the engine shaft and will thereby avoid danger of loss of the propeller under extreme thrust conditions.

A still further object is to construct the mechanical details necessary to accomplish the foregoing objects without rendering it necessary to lengthen a standard engine shaft or to modify it in any way. It is only necessary to add a few simple parts to the standard propellers now in use and to attach certain parts to the fuselage and to the engine shaft as now constructed.

Another object is to provide means for synchronizing the thrust recording instrument with other instruments for indicating or recording engine speed, altitude, air speed, and other conditions that must be known in order to judge the performance of a propeller. In other words, it is proposed to indicate by permanent marks on the thrust record the exact points in order of time along the thrust record at which observations of the other instruments were taken by the observer. As a result, the engine speed, altitude, etc., may be compared at the end of the flight with the thrust at the time each of these other readings was taken.

Further objects may become apparent as the following specific description is read in connection with the accompanying drawings, in which:

Fig. 1 is a sectional view of the device applied to an aircraft propeller, the latter being broken away;

Fig. 2 is a longitudinal section showing a recording device which has purely mechanical means coupled therewith for synchronizing a thrust record with the record of additional data;

Fig. 3 is a side elevation, partly in section, of an electrical synchronizing device applied to the thrust recording instrument; and Fig. 4 is a plan view of the latter.

Before attempting to describe any particular mechanism, it will be pointed out that the generic principle of this invention resides in means, broadly speaking, for permitting limited axial movement of the driven member whose thrust is to be measured with respect to the driving member, and then translating such axial relative movement under running conditions into terms of thrust. This principle also embodies the indicating and recording of the variable thrust throughout the operation of the driven member.

Since the application of the basic principle just defined to the aeronautical art as means for measuring the thrust of an aircraft propeller seems to be a convenient embodiment of the invention for use by way of example, a suitable organization of mechanism for this purpose will now be described in detail. It is to be understood, however, that the details disclosed are only illustrative and that I do not intend to be restricted to the use of this specific construction in practice. Even in a device for measuring the thrust of a propeller, various modifications, alternative arrangements, and substitutions of equivalent parts may be made without departing from the spirit of the invention.

The particular mechanism which has been adopted for the purpose of the present disclosure and which is shown in the accompanying drawings, may be analyzed into four primary groups, viz: (1) A connecting device for the driving and driven members (in this case, the engine shaft and propeller respectively), which mounts the driven member for limited axial movement relative to the driving member, which causes the driven member to be rotated positively by the driving member regardless of the degree of axial displacement, which yieldably resist axial movement of the driven member relative to the driving member, and which positively limits such axial displacement and prevents loss of the driven member under extreme thrust conditions; (2) thrust-responsive indicating and recording means; (3) thrust transmitting means adapted to communicate variations in thrust from the driven member to the thrust indicating and recording device; and (4) a synchronizing device by the use of which a record may be made on the thrust record to indicate each point during the recording of thrust at which certain necessary readings were taken by the use of other instruments and recorded for subsequent consideration and comparison with the thrust record for any particular flight.

The connecting device will first be described with reference to Figures 1 and 2 of the drawings, in particular. The numerals 1 and 2 designate the engine shaft, or driving member, and the propeller, or driven member, respectively. In order that the propeller may slide longitudinally upon the end of shaft 1, the latter is preferably provided with an extension bearing member 3 of tubular construction affording a cylindrical peripheral bearing surface, and a bearing sleeve 4 adapted to fit the extension bearing member 3 is inserted through the hub 5 of the propeller. As shown, end bushings 6 and 7 may be provided in the bearing sleeve 4 for frictional contact with the periphery of extension bearing member 3. The extension bearing member should be of sufficiently greater effective length than sleeve 4 to permit axial displacement of the sleeve thereon throughout a range commensurate with the variation in thrust from zero to the maximum for the particular engine with which the propeller is used.

While the extension bearing member 3 may be secured to shaft 1 in different ways, this may be accomplished by means of the mechanism shown particularly in Fig. 1. In this instance, the extension bearing member is secured at its inner end against rotation relative to the shaft by means of key 8. The extension bearing member is internally tapered at this inner end as at 9 in order to fit the tapered spindle 10 formed at the end of the engine shaft. The extension bearing member projects past the end of this shaft to a considerable extent, so it is considered desirable to insert a stud 11 into the outer end of the extension bearing member. This stud has its inner end tapped out at 12 and engaged with the threaded extremity 13 of the spindle. Stud 11 is enlarged at 14 to provide a bearing surface for contact with the inner surface of the extension bearing member at its outer end. This bearing serves to align the extension bearing member properly with the stud and engine shaft. A radial flange 15 is formed on the enlarged portion of the stud just mentioned adjacent to the outer end of extension bearing member 3 and is adapted to project past the periphery of the extension bearing member so as to serve as a stop for contact with the outer end of sleeve 4 in the event that the propeller moves axially to that extent under extreme thrust conditions in practice. This flange will positively prevent loss of the propeller from the engine shaft.

In order to lock the stud 11 against turning movement relative to the extension bearing member and engine shaft, the locking device which will now be described may be employed, but it is obvious that some other suitable locking means might serve the purpose. In this instance, stud 11 has a turning head 16 formed adjacent to flange 15 and provided with a plurality of flats 17 to which a wrench, or other turning tool, may be applied for the purpose of screwing the stud onto the shaft spindle. A threaded hole 18 is tapped in each flat for the reception of a binding screw 19 which may be interchangeably engaged with these holes. Flange 15 is provided with an axial aperture 20 adjacent to each flat of the turning head and positioned so that its axis is coplanar with the axis of the corresponding hole 18. The edge of extension bearing member 3 is provided with a plurality of axial holes 21 adapted to be brought into registration interchangeably with one of the apertures 20 in the stud flange. A lock pin 22 is adapted to be inserted through an appropriate aperture 20 for engagement with the hole 21 aligned therewith when the stud 11 has been tightly screwed onto the threaded end of the shaft spindle. The lock pin has a head 23 on its outer end provided with a transverse opening 24 adapted to receive the binding screw 19. Thus, the binding screw may be inserted through the head of the locking pin and then threaded into the aligned hole 18 in the turning head of the stud in order to secure the locking pin against accidental detachment. This locking mechanism will serve effectively to secure the stud against displacement relative to the extension bearing member and is adapted to secure the stud in any position.

The sleeve 4 may be secured rigidly to the propeller hub in any desired manner, but it is found convenient to provide a radial flange 25 on the inner end of the sleeve and to bolt this flange to the hub as shown in Fig. 1.

This sleeve flange may be utilized also in driving the propeller positively from the engine shaft irrespective of its axial position on the extension bearing member 3 of the engine shaft, although some other driving connection might be substituted. For this purpose flange 25 is extended past the periphery of the propeller hub and has a plurality of tracks 26 formed thereon and disposed at diametrically opposite points. These tracks face in the same direction relative to rotation of the propeller. A radial flange 27 provided on the inner end of extension bearing member 3 has axially projecting dogs 28 corresponding in number and position to the tracks 26 of the sleeve flange and adapted to traverse the tracks. In order to reduce friction, dogs 28 are provided with rollers 29 journaled on radial pins 30, and these rollers are adapted to bear against the tracks. Each track may be faced with a removable strip 31 of suitable bearing material in order that the track may be refaced when its strip becomes objectionably worn in use. This facing is adapted to be secured to the track by means of the screws 32 and is of such breadth and extent that the roller 29 of the corresponding dog will bear against it throughout its entire extent of travel as the propeller is moved axially on its bearing due to the influence of thrust.

It is to be understood that some other means for driving the propeller from the engine shaft which would admit of limited axial displacement of the propeller might be employed instead of the roller and track arrangement just described.

In order that axial displacement of the propeller along its bearings under running conditions will be the true function of the thrust, it is desirable to provide means for resisting such displacement, which will offer steadily increasing resistance as the displacement increases. For this purpose, various devices might answer, but a compression spring such as that designated by the numeral 33 in Fig. 1 will fulfill the requirements. This spring is preferably interposed between the propeller hub and a circular plate 34 which is adjustable on a stem 35 projecting from stud 11. The initial tension of spring 33 may be adjusted by means of a nut 36 threaded on stem 35. For the purpose of locking the adjusting nut on the stem in adjusted position, the nut may be provided with transverse holes 37 for interchangeable registration with longitudinally spaced holes 38 in the stem. By inserting a cotter pin 39, or equivalent device, through a nut hole and a selected stem hole 38, the nut may be locked very effectively in adjusted position.

Assuming that the propeller is in its zero or non-thrust position, as shown in Fig. 2, wherein flanges 25 and 27 abut each other, the resisting spring 33 is adjusted initially so that the propeller is placed under tension of any desired degree. When the engine is started and the propeller increases in speed of rotation, its boring effect will produce a definite degree of thrust proportional to the R. P. M. This thrust is resisted and absorbed by the spring. Since the tension of the spring will increase as the thrust against it increases. it follows that the linear displacement of the propeller along the axis of the engine shaft will be in direct proportion to the thrust. Therefore, the degree of thrust may be read directly from the axial displacement of the propeller.

The thrust of the propeller being now capable of translation into linear movement, through the agency of spring 33, it is simply necessary to communicate the displacement of the propeller on its bearing to some indicating device in order to have a direct reading of the thrust. Various indicators may be adopted, but the recording indicator shown in detail in Fig. 2 is admirably adapted for this use. This indicator includes a case 40 containing clock mechanism which may be secured to some suitable part of the fuselage, preferably in a sheltered position within the latter. A drum 41 adapted to bear an indicator card 42 is rotatably mounted on the case and is adapted to be driven at a constant rate of speed by means of the clock mechanism. The numeral 43 designates a handle by means of which the drum may be started and stopped at will. A stylus 44 is adapted to bear against the indicator card so as to produce a graphic representation of the thrust in the form of a curve 45 on the card when the drum is rotating and the propeller is functioning. This stylus is slidably mounted in an adjustable holder 46 which is threaded into a slide 47 mounted in a bearing tube 48 projecting from the case 40. This bearing tube extends parallel to the axis of the drum and thereby mounts the slide 47 for movement in the same direction. A spring 49 disposed in holder 46 is interposed between the stylus and an adjustable nut 50, by means of which the tension of the spring may be adjusted. This tension should be adjusted until the point of the stylus bears against the indicator card with the desired pressure.

Axial displacement of the propeller with respect to the engine shaft may be communicated to the slide 47 of the indicator through the medium of a thrust rod 52 which includes two relatively adjustable sections 53 and 54 which are connected together by means of a turn-buckle 55. This turn-buckle serves as means for adjusting the effective length of the thrust rod as a whole and is adapted to be locked in adjusted position by means of the lock wire 56. Section 53 of the rod is joined to the slide 47, and section 54 is provided at its free end with a bearing roller 57 which is adapted to bear against an annular track 58 on the flange 25 of the bearing sleeve 4 of the propeller hub. The thrust rod is guided in its longitudinal movement by means of a bearing 59 which is mounted rigidly upon some convenient part of the fuselage structure. The roller 57 may be termed a follower, broadly, since some other device which would not offer too much friction might be substituted therefor. This is maintained in firm contact with the track on the propeller hub by means of a follower spring 60 which is interposed between head 61 on the thrust rod and adjustable nut 62 in the bearing 59. Nut 62 is adjustable so that the tension of the follower spring may be regulated when necessary.

The effective length of thrust rod 52 should be such that the stylus will bear against the indicator card near the edge opposite to the propeller when the latter is in a position of rest and the thrust is zero. The card should be of such width that the stylus may traverse the card from the edge just mentioned to the opposite edge without danger of running off the card when the thrust is extremely high. In fact, the bearing tube 48 for slide 47 is provided with slots 63 and 64 through which the stylus holder 46 may work, and these slots limit the degree of movement of the stylus along the drum to an extent less than the width of the card. When the propeller is not running and the time-controlled operating mechanism for the drum is started, the stylus will describe a straight line 65 on the card which has been fastened to the periphery of the drum. This line represents a condition of no thrust and may be termed the "zero line."

The indicator card is preferably one which bears a coordinate system on that face which is to be disposed outermost. The abscissæ of this coordinate system may be graduated in terms of units of time, and the ordinates may represent units of thrust. In this manner, a graph will be obtained which will be a continuous log of thrust for a particular flight. From the thrust curve of this graph, the thrust at any particular stage in the flight may be read directly, and the manner in which the thrust increases or decreases during various stages of the flight may be ascertained. While a particular form of stylus has been illustrated in the drawings and described herein by way of example, it is obvious that some other stylus might be used instead. There are more complex types of stylus now in use in recording devices which may possess some advantages over the simple form of stylus shown in the accompanying drawings, but that disclosed in this case is sufficiently accurate for the present disclosure.

In judging the performance of a propeller, there are certain factors other than thrust which must be considered. Some of these factors are engine speed and certain conditions which affect the same, air speed, altitude, rate of climb or glide, strut temperature, etc. It is highly desirable that some provision be made for comparison of these factors with the thrust at certain stages of a performance flight, such as during a climb or glide, while flying at some particular altitude, while throttling the engine or running the same wide open, or under other conditions which are very material in a performance test. In order that the reading of instruments indicating the factors just enumerated may be synchronized with the thrust reading at any desired point in the flight, I have provided an auxiliary instrument which will make a legible mark on the thrust record when actuated by the observer who takes the readings. The mark will indicate the time at which the readings were made and will thus permit comparison at any subsequent time. This auxiliary instrument, which may be called the "synchronizing device", includes a slide 66 which works in one end of bearing tube 48 on the clock case 40 and which carries a second stylus 67 adapted to bear against the indicator card adjacent to the stylus 44. The construction of stylus and its holding means are identically the same as the corresponding features of the first mentioned stylus, so they will not be described in detail. The second stylus is limited in its movement by slots 68 in the bearing tube and is normally maintained in the inoperative position of Fig. 2 by means of spring 69. This spring may be adjusted in tension by means of nut 70. In order that the second stylus may be shifted against the tension of spring 69 to describe a short synchronizing mark on the indicator card, such as one of those indicated by the numeral 71, some convenient manipulating device, such as wire 72, leading to the observer's cockpit may be provided. When the observer makes certain readings material to the performance test and which should be compared with the thrust record after the flight is terminated, he pulls the wire 72 and notes the time on his own record. The synchronizing mark which is thus made on the thrust record indicates a certain point on the thrust curve, and the point of time is evident from the scale of abscissæ on the card. Every time the observer makes important readings of other instruments, he causes the registration of a synchronizing mark on the thrust record in the manner just described. Then, at the end of the flight, he can synchronize his groups of readings with the respective synchronizing marks on the thrust record and can make the necessary comparison of factors essential to the performance test.

In Figures 3 and 4 an electrical synchronizing device is represented as a modification which may be employed instead of the purely mechanical device just described. In this instance, the stylus 67ª is supported by a holder in the form of a lever 73 which is pivoted in a bracket 74 on the clock case 40ª. The arm of this lever opposite to that which bears the stylus functions as an armature 75 for electro-magnet 76 mounted in the clock case. This electro-magnet is connected in a normally open circuit with a source of current 77. The circuit includes a switch 78 which may be closed to cause energization of the electro-magnet and consequent attraction of the armature. A spring 79 tends to maintain the stylus holder in inoperative position with the armature separated from the core of the electro-magnet. Energization of the magnet overcomes the influence of the spring and causes the stylus to shift and describe a synchronizing mark on the indicator card. The bracket 74 is itself pivotally mounted on the clock case by means of a pivot pin 80 at one side of the stylus holder. A pin and slot connection 81 between the other side of the bracket and the clock case permits limited angular adjustment of the bracket around its own axis. A spring 82 tends to maintain the bracket in such a position that the stylus will bear firmly against the indicator card. The formation of the armature is such that it will be in operative relation to the magnet at all times, irrespective of angular adjustment of the bracket 74. The switch 78 is preferably mounted in the observer's cockpit where it is readily accessible for the purpose of closing the circuit and thereby causing the inscription of synchronizing marks on the thrust record at the will of the observer.

I claim:

1. In a device for measuring the thrust force of a screw propeller carried by a driving shaft, bearing means mounting the propeller for longitudinal play on the shaft, means for driving the propeller positively from the shaft irrespective of such play, a spring interposed between shaft and propeller to resist longitudinal play of the latter, means by which the tension of the spring may be varied, and means for indicating the degree of play of the propeller.

2. In a device for measuring the thrust force of a screw propeller carried by a driving shaft, coacting bearing members provided upon the shaft and propeller to mount the latter for longitudinal play on the former, a longitudinal track provided on one of the bearing members, and an anti-friction bearing element provided on the other bearing member and adapted to contact with said track to drive the propeller positively from the shaft irrespective of longitudinal play, and means for indicating the degree of longitudinal play of the propeller.

3. In a device for measuring the thrust force of a screw propeller carried by a driving shaft, coacting bearing members provided on propeller and shaft to mount the former for longitudinal play on the latter, means for fixing one bearing member on the shaft, a stud detachably engaged with the end of the shaft, means for securing the stud detachably to the said bearing member, and means for indicating the degree of longitudinal play of the propeller.

4. In a device for measuring the thrust force of a screw propeller carried by a driving shaft, means for mounting the propeller for longitudinal play on the shaft, means for limiting the extent of play of the propeller, means by which the limits of play may be adjusted relatively, and means for indicating the degree of longitudinal motion of the propeller relative to the shaft.

5. In a device for measuring the thrust force of a screw propeller carried by a driving shaft, coacting bearing members provided on propeller and shaft to mount the former for longitudinal play on the latter, limiting flanges provided on one bearing member for contact with the other bearing member to limit the extent of play, and means for indicating the degree of longitudinal motion of the propeller relative to the shaft.

6. In a device for measuring the thrust force of a screw propeller carried by a driving shaft, coacting bearing members provided on propeller and shaft to mount the former for longitudinal play on the latter, a stud adjustably engaged with the shaft, a limiting flange provided on the stud for contact with the bearing member carried by the propeller to limit the extent of longitudinal play, and means for indicating the degree of such play.

7. In a device for measuring the thrust force of a screw propeller carried by a driving shaft, coacting bearing members provided on propeller and shaft to mount the former for longitudinal play on the latter, a stud adjustably engaged with the shaft, a limiting flange provided on the stud for contact with the bearing member carried by the propeller to limit its longitudinal play, a stem on the stud projecting past the limiting flange, a plate provided on the stem, a spring interposed between the said plate and the propeller to resist longitudinal play of the latter, and means for indicating the degree of such play.

8. In a device for measuring the thrust force of a screw propeller carried by a driving shaft, coacting bearing members provided on the propeller and shaft to mount the former for longitudinal play on the latter, a stud adjustably engaged with the shaft, a limiting flange provided on the stud for contact with the bearing member of the propeller to limit the extent of play, a stem on the stud projecting past the limiting flange, a plate carried by the stem, a spring interposed between the plate and the propeller to resist such play, means for adjusting the plate on the stem, and means for indicating the degree of longitudinal play of the propeller.

9. In a device for measuring the thrust force of a rotary member having longitudinal play, an annular track provided on the rotary member, an indicator including a card holder, a stylus movably associated with the card holder, a follower bearing against the track, and means connecting the stylus with the follower for corresponding motion.

10. In a device for measuring the thrust force of a screw propeller carried by the driving shaft, an annular track provided on the propeller, an indicator including a card holder, a stylus movably associated with the card holder, a follower bearing against the track on the propeller, and means connecting the follower with the stylus for corresponding motion.

11. In a device for measuring the thrust force of a screw propeller carried by a driving shaft, an indicator including a card holding drum, a stylus movably associated with the drum, means for rotating the drum at constant speed, and means for transmitting longitudinal motion from the propeller to the stylus.

12. In a device for measuring the thrust of a screw propeller carried by the propeller driving shaft, a screw propeller longitudinally movable on its driving shaft, spring means resisting said longitudinal movement, an annular track on the propeller, a follower bearing against said track, a recorder, and means connecting the follower with the recorder.

13. In a device for measuring the thrust of a screw propeller carried by the propeller driving shaft, a screw propeller longitudinally movable on its driving shaft, spring means resisting said longitudinal movement, an annular track on the propeller, a follower bearing against said track, a thrust indicator, and means connecting the follower with said indicator.

14. In a device for measuring the thrust force of a rotary member having longitudinal play, an indicator including a card holder, a stylus movably associated with the card holder, means for transmitting longitudinal motion from the rotary member to the stylus, a synchronizing stylus movably associated with the card holder, and means by which the synchronizing stylus may be operated.

15. In a device for measuring the thrust force of a rotary member having longitudinal play, an indicator including a card holding drum, a stylus movably associated with the drum, means for rotating the drum at constant speed, means for transmitting longitudinal motion from the rotary member to the stylus, a synchronizing stylus movably associated with the drum, and means by which the synchronizing stylus may be operated.

16. In a device for measuring the thrust force of a screw propeller carried by a driving shaft, means for mounting the propeller for longitudinal play on the shaft, an indicator including a card holder, a stylus movably associated with the card holder, means for transmitting longitudinal motion from the propeller to the stylus, a synchronizing stylus movably associated with the card holder, and means by which the synchronizing stylus may be operated.

17. In a device for measuring the thrust force of a screw propeller carried by a driving shaft, means for mounting the propeller for longitudinal play on the shaft, an indicator including a card holding drum, a stylus movably associated with the drum, means for rotating the drum at constant speed, means for transmitting longitudinal motion from the propeller to the stylus, a synchronizing stylus movably associated with the drum, and means by which the synchronizing stylus may be operated.

In testimony whereof I affix my signature.

FRANK W. CALDWELL.